(12) United States Patent
Taaghol

(10) Patent No.: US 8,620,380 B2
(45) Date of Patent: Dec. 31, 2013

(54) SUBSCRIBER IDENTITY MODULE HAVING A PLURALITY OF SUBSCRIBER IDENTITIES

(75) Inventor: Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1710 days.

(21) Appl. No.: 11/468,259

(22) Filed: Aug. 29, 2006

(65) Prior Publication Data

US 2008/0057892 A1    Mar. 6, 2008

(51) Int. Cl.
 *H04B 1/38* (2006.01)
(52) U.S. Cl.
 USPC ............... 455/558; 455/187.1; 379/433.09; 379/211.05
(58) Field of Classification Search
 USPC ............ 455/558, 187.1; 379/433.09, 211.05
 See application file for complete search history.

(56) References Cited

U.S. PATENT DOCUMENTS

| | | | |
|---|---|---|---|
| 5,884,168 A | | 3/1999 | Kolev et al. |
| 6,978,156 B1 | | 12/2005 | Papadopoulos et al. |
| 2002/0006808 A1 | | 1/2002 | Onaka et al. |
| 2004/0192386 A1 | | 9/2004 | Aerrabotu et al. |
| 2004/0229601 A1* | | 11/2004 | Zabawskyj et al. ........... 455/417 |
| 2005/0075106 A1* | | 4/2005 | Jiang ........................ 455/432.3 |
| 2005/0164737 A1* | | 7/2005 | Brown .......................... 455/558 |
| 2007/0238467 A1* | | 10/2007 | Buckley et al. ............... 455/445 |

OTHER PUBLICATIONS

"The Future Mobile Payments Infrastructure, A Common Platform for Secure M-Payments," Institute for Communications Research Systems @ Work Pte. Ltd., Dec. 28, 2001, 36 pgs.
Allan Baw, "IMS Service Mobility—Beyond Voice Call Continuity," TMCnet Articles, Aug. 17, 2006, 5 pgs., http://www.tmcnet.com/scripts/print-page.aspx?PagePrint=http%3a%2f%2fwww.tmcnet.com%2fnews%2fit%2f2006%2f06%2f02%2f1667856.htm.
John Meredith, "Voice call continuity in 3GPP," CompactPCI and AdvancedTCA Systems, Apr. 2006, 2 pgs.
International Search Report and Written Opinion for PCT/US2007/076141, mailed Nov. 23, 2007, 9 pages.
International Preliminary Report on Patentability for PCT/US2007/076141, mailed Mar. 3, 2009, 4 pages.
Office Action for CN 200780031192.0 mailed Mar. 16, 2011, 3 pages.
Office Action for CN 200780031192.0 mailed Mar. 12, 2012, 3 pages.
Office Action for CN 200780031192.0 mailed Aug. 31, 2012, 3 pages.

* cited by examiner

*Primary Examiner* — Olumide T Ajibade Akonai
*Assistant Examiner* — Michael Irace
(74) *Attorney, Agent, or Firm* — Schwabe, Williamson & Wyatt, P.C.

(57) ABSTRACT

Embodiments of apparatuses, articles, methods, and systems for utilizing a subscriber identity module having a plurality of subscriber identities for communications within wireless networks are generally described herein. Other embodiments may be described and claimed.

23 Claims, 4 Drawing Sheets

SUBSCRIBER IDENTITY MODULE HAVING A PLURALITY OF SUBSCRIBER IDENTITIES

FIELD

Embodiments of the present invention relate generally to the field of wireless telephony networks, and more particularly to a subscriber identity module having a plurality of subscriber identities to be used in devices of said wireless networks.

BACKGROUND

Mobile telephony may provide for wireless voice communication by mobile equipment used in a public land mobile network (PLMN). A user may utilize a mobile station to communicate with other entities that belong to the PLMN or another network that is coupled to the PLMN. The PLMN may itself, contain a number of different network domains. As the station travels from one network domain to another, so must the call handling responsibilities. The number and types of existing network domains continually increase with each one having associated capabilities and standards of communicating designed to match the objectives of the particular domain. Roaming between these different domains and utilization of their particular capabilities and standards may present a variety of challenges for handling calls of a mobile station.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Embodiments of the present invention may provide a method, article of manufacture, apparatus, and system for utilization of a subscriber identity module (SIM) having a plurality of subscriber identities.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrase "A/B" means "A or B." The phrase "A and/or B" means "(A), (B), or (A and B)." The phrase "A, B, and/or C" means "(A), (B), (C), (A and B), (A and C), (B and C) or (A, B and C)." The phrase (A) B means "(B) or (A and B)," that is, A is optional.

As used herein, reference to a "component" may refer to a hardware, a software, and/or a firmware component employed to obtain a desired outcome. Although only a given number of discrete components may be illustrated and/or described, such components may nonetheless be represented by additional components or fewer components without departing from the spirit and scope of embodiments of the invention. The term "element" may be used interchangeably with "component."

Figure 1:
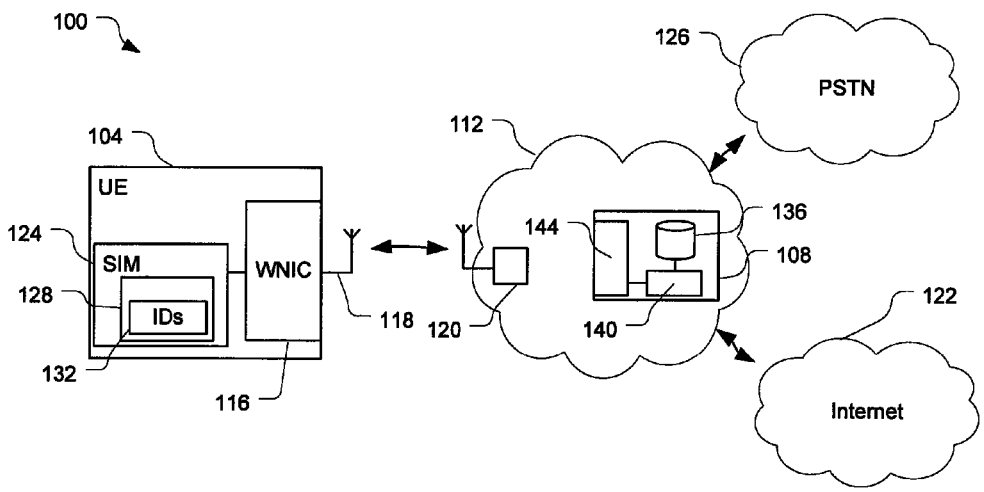
FIG. 1 illustrates a mobile communication system in accordance with an embodiment of this invention.

FIG. 1 illustrates a communication system 100 in accordance with an embodiment of this invention. The mobile communication system 100 may include a mobile network device, e.g., a station 104, coupled to a voice-call continuity (VCC) server 108 of a mobile telephony network 112 (hereinafter "network 112"). VCC, as used herein, may refer to services that allow for a handover of an existing voice call from one network access domain to another without interrupting the call. A handover may also be referred to as a handoff.

The station 104 may include a network interface, e.g., a wireless network interface card (WNIC) 116 designed to use an antenna structure 118 to allow the station 104 to communicate with entities of the network 112 via wireless connection with a network access device 120. The station 104 may also communicate with entities of other networks, e.g., Internet 122 and/or public switched telephone network (PSTN) 126, that are coupled to the network 112.

The station 104 may include a SIM 124 having an identity manager 128 to cooperate with the WNIC 116 to register one or more of a plurality of subscriber identities 132 with the VCC server 108, more particularly, with a database 136 of the VCC server 108. The VCC server 108 may also include a service manager 140 and a network interface 144 to communicatively couple the VCC server 108 to other network entities, e.g., network access device 120. The VCC server 108 may provide functionality to receive and process mobile application part (MAP) transactions and messages among the entities of the network 112.

The registered subscriber identities may be utilized to access various information on the station 104 stored in the database 136. The service manager 140 may also use the registered subscriber identities as indicia of a requested level of service, which will be discussed in further detail below. In various embodiments the database 136 may be a home location register (HLR) and/or a home subscriber station (HSS).

The subscriber identities 132, which may be, e.g., international mobile subscriber identities (IMSIs), mobile identification numbers (MINs), etc., may be unique numbers that are associated with the station 104. The subscriber identities 132 may each be mapped to the same mobile phone number, e.g., mobile station international subscriber directory number (MSISDN). A subscriber identity may be, e.g., a 15-digit number with the first three digits indicating a country code, the next two or three digits indicating a network code, and the remaining digits indicating a unique subscriber number within the network's customer base.

In various embodiments, the station 104 may be any type of device capable of wirelessly communicating with entities of the network 112. For example, the station 104 may be, but is not limited to, a mobile phone, mobile personal computer, personal digital assistant, or a smart phone. In various embodiments, the antenna structure 118 may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions.

The network 112 may be a network such as a public land mobile network (PLMN) with the entities communicating according to any of a variety of mobile communication standards such as those developed by the 3rd Generation Partnership Project (3GPP), e.g., the Global System for Mobile Communication (GSM) standard. The mobile telephony network 112 may include a variety of mobile access domains. For example, in an embodiment, the network 112 may include a packet-switched Internet Protocol (IP) Multimedia Subsystem (IMS) access domain to provide both mobile and fixed multimedia services for the station 104. The mobile telephony network 112 may also include circuit-switched (CS) mobile access domain.

In an embodiment, the station 104 may have VCC capabilities that allow for a voice call to be handed-over between heterogeneous access domains, e.g., between an IMS domain and a CS domain. When the VCC enabled station 104 communicates over networks supporting a VCC call a seamless handover between these access domains may occur without a noticeable disruption to the voice call. A network domain providing VCC support may be referred to as an intelligent network (IN) utilizing, e.g., Customized Applications for Mobile Networks Enhanced Logic (CAMEL), operating on a GSM core network.

While VCC services may allow for seamless handover of a voice call, there may be instances in which a VCC call may not be desirable and/or possible. For example, when the call termination and origination points are both in a CS domain providing, or attempting to provide, a VCC call may introduce unnecessary inefficiencies. These inefficiencies may include a high number of control signals being transmitted if VCC support is not found in order to downgrade the service to a non-VCC call. This may be the case if, e.g., a VCC server in the home network domain (e.g., VCC server 108) attempts to inform a non-IN, visited network domain using CAMEL procedures that a CS procedure is to be followed. These inefficiencies may result in a call-failure or service delay.

In an embodiment, selective registration of the one or more of the subscriber identities 132 by the identity manager 128 may indicate to the VCC server 108 a preference of the station 104 with respect to VCC services. For example, the station 104 may register a particular subscriber identity to indicate a request for VCC services, e.g., the station 104 can and wishes to receive VCC calls. This may be referred to as a VCC subscriber identity. The station 104 may register another subscriber identity to indicate that VCC services are not requested, e.g., the station 104 is not able to and/or does not wish to receive VCC calls. This may be referred to as a non-VCC subscriber identity.

In various embodiments, the identity manager 128 may determine call-continuity parameters to decide which of the subscriber identities to register. In various embodiments, call-continuity parameters may include any data relevant to determining whether or not a VCC call is possible and/or desirable. Examples of call-continuity parameters will be discussed in greater detail below with respect to various embodiments.

Figure 2:
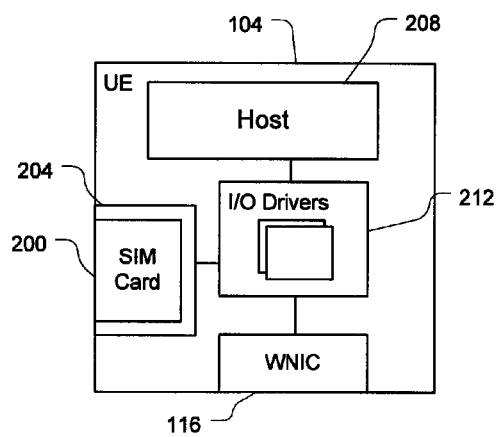
FIG. 2 illustrates a station in accordance with an embodiment of this invention.

FIG. 2 illustrates the station 104 in accordance with an embodiment of this invention. In this embodiment, the station 104 may receive a SIM card 200 in a port 204 to implement the SIM 124. The SIM card 200 may be a smart card, e.g., a universal integrated circuit card (UICC), designed to securely store information related to, e.g., identities, subscriptions, security mechanisms, user preferences, etc. The station 104 may include a host 208 communicatively coupled to the SIM card 200 and the WNIC 116 via input/output drivers 212.

The identity manager 128 may include a SIM application toolkit (SAT) to provide a standardized execution environment to provide interoperability between the SIM card 200 and a large number of stations, regardless of the type or manufacturer of the station. The SAT may allow for the components on the SIM card 200 to utilize certain functions of the station 104.

Figure 3:
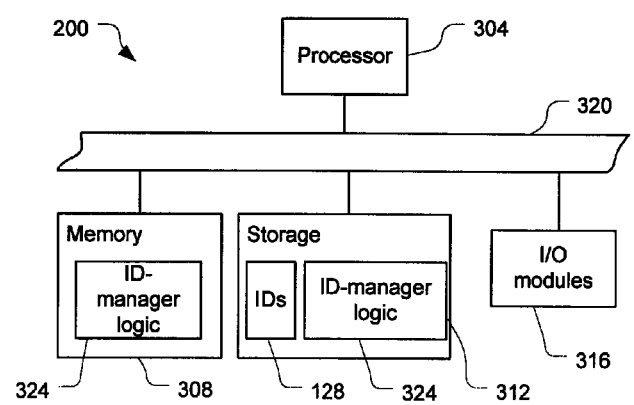
FIG. 3 illustrates a subscriber identity module in accordance with an embodiment of this invention.

FIG. 3 illustrates the SIM card 200 in accordance with an embodiment of this invention. The SIM card 200 may include a processor 304, memory 308, storage 312, and an input/output module 316 coupled to each other via a bus 320, as shown. The SIM card 200 may also include an input/output module 316 to interface with the port 204 and I/O drivers 212.

Memory 308 and storage 312 may include in particular, temporal and persistent copies of ID-manager logic 324, respectively. The ID-manager logic 324 may include instructions that when accessed by the processor 304 result in the SIM card 200 performing operations or executions described in conjunction with the SIM 124 in accordance with embodiments of this invention. In particular, the accessing of the ID-manager logic 324 by the processor 304 may facilitate subscriber-identity selection and registration operations of the identity manager 128 as described herein in connection with various embodiments. The instructions implementing the ID-manager logic 324 may be provided to memory 308 and storage 312 from a machine-accessible medium.

The storage 312 may also include copies of the subscriber identities 132 and other subscriber information. In various embodiments, the storage 312 may store this information in flash memory or some other type of non-volatile storage medium.

In various embodiments, storage 312 may be a storage resource physically part of the SIM card 200 or it may be accessible by, but not necessarily a part of, the SIM card 200. For example, the storage 312 may be accessed by the station 104 over the network 112.

In various embodiments, the memory 308 may include RAM, dynamic RAM (DRAM), static RAM (SRAM), synchronous DRAM (SDRAM), etc.

In various embodiments, the processor 304 may include one or more single-core processors, multiple-core processors, controllers, application-specific integrated circuits (ASICs), etc.

In various embodiments, SIM card 200 may have more or less elements, and/or different architectures.

Figure 4:
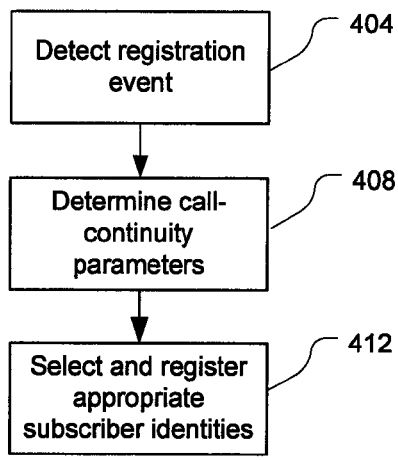
FIG. 4 illustrates a subscriber identity registration in accordance with an embodiment of this invention.

FIG. 4 illustrates a subscriber identity registration in accordance with an embodiment of this invention. In this embodiment, the identity manager 128 may detect a registration event, block 404. A registration event may be, e.g., a power-on of the station 104, an initial connection to the network 112, a location update event (e.g., when the station 104 detects a different area code), etc.

The identity manager 128 may then communicate with the host 208 and/or the network 112 to determine call-continuity parameters, block 408. In various embodiments, this may include capabilities of the network 112 (and in particular the access domain to which the station 104 is connected), capabilities of the station 104, and/or settings of the station 104.

The identity manager 128 may then select one or more appropriate subscriber identities from the subscriber identities 132, based at least in part on determined call-continuity parameters, and cooperate with the WNIC 116, either directly or through the host 208, to register the selected subscriber identities, block 412.

Figure 5:
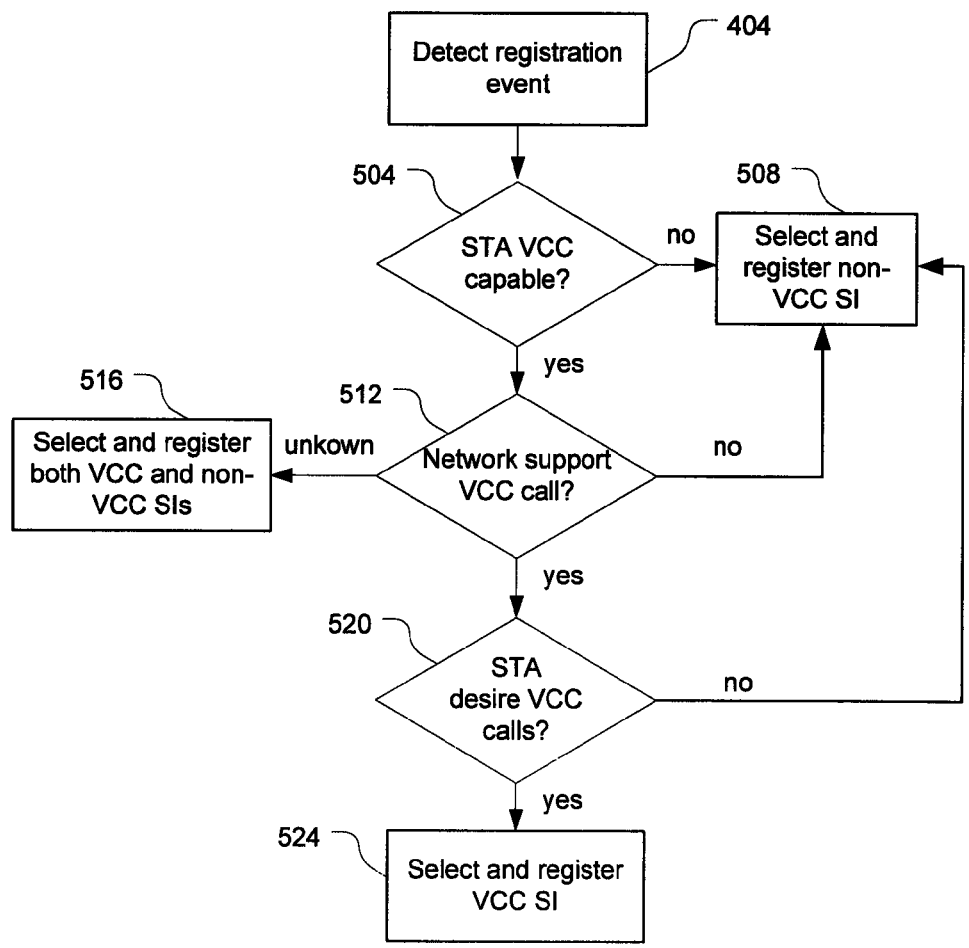
FIG. 5 illustrates a subscriber identity registration in accordance with another embodiment of this invention.

FIG. 5 illustrates a subscriber identity registration in accordance with another embodiment of this invention. In this embodiment, similar to the above embodiment, the registration may be initiated with a detection of a registration event, block 404. As discussed above, the SIM card 200 may be compatible with a wide variety of stations, including legacy stations. Therefore, the identity manager 128 may communicate with the host 208 to determine if the station 104 is VCC capable, block 504. In an embodiment, this may be determined based at least in part on the type of identity request posted to the SIM card 200 from the host 208. For example, if the VCC flag is set in the identity request from the host 208, then the identity manager 128 may determine that the station 104 is VCC capable. If the station 104 is not VCC capable, the identity manager 128 may select and register the non-VCC subscriber identity, block 508.

If the station 104 is VCC capable, the identity manager 128 may determine if the network 112 (and in particular, an access domain to which the station 104 is connected) can support a VCC call, block 512. Whether the access domain can support a VCC call may be indeterminable by the station 104. If this is the case, then the identity manager 128 may select and register both the VCC subscriber identity and the non-VCC subscriber identity, block 516. If it is determined that the access domain cannot support a VCC call, the identity manager 128 may select and register the non-VCC subscriber identity, block 508.

In some embodiments, the identity manager 128 may be able to determine if the access domain can support a VCC call. For example, if the access domain is the home domain, the identity manager 128 may conclude there is sufficient VCC support. If it is determined that the access domain can support a VCC call, the identity manager 128 may determine whether the station 104 desires VCC calls, block 520. If the station 104 desires VCC calls, the identity manager 128 may select and register the VCC subscriber identity, block 524.

The figures to be discussed below may present some examples of specific scenarios in which the station 104 may be deployed in accordance with embodiments of this invention. Other scenarios are within the scope of the teachings of embodiments of this invention.

Figure 6:
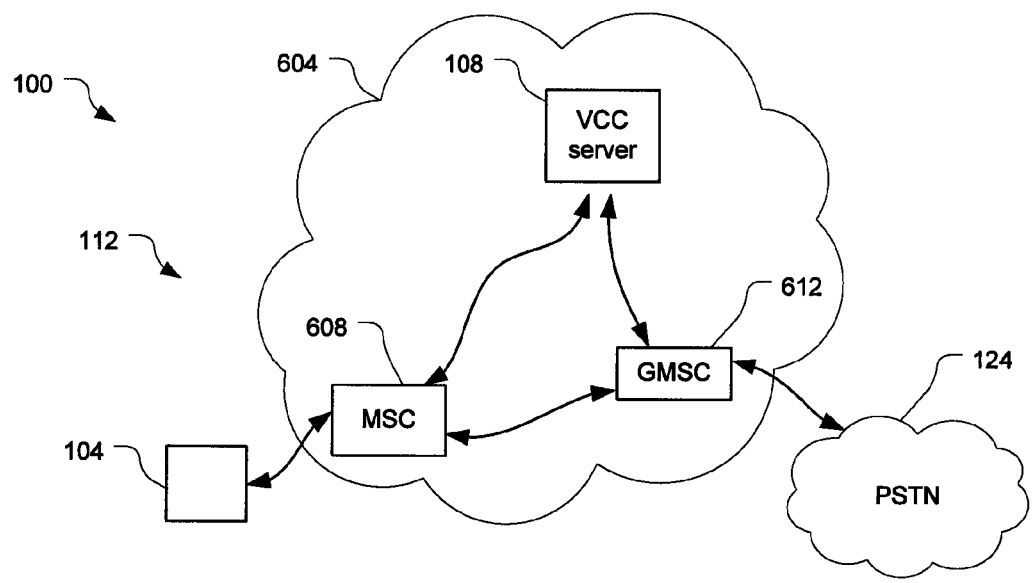
FIG. 6 illustrates the mobile communication system in accordance with another embodiment of this invention.

FIG. 6 illustrates the mobile communication system 100 in accordance with an embodiment of the present invention. In this embodiment the network 112 may be a (visited) home domain 604. That is, the station 104 may be coupled to a home domain directly, or indirectly through a visited domain. The home domain may be the domain to which the station 104 subscribes and therefore has the primary responsibility for provisioning services to the station 104 and managing billing functions. If the station 104 is roaming in an area not serviced by the home domain it may still connect to the network 112 through a visited network domain that has a subscription agreement with the home domain.

In this embodiment, the identity manager 128 may determine that the station 104 is a legacy station without VCC capability. Therefore, the identity manager 128 may select and register the non-VCC subscriber identity with the VCC server 108. Communication between the station 104 and other network entities may be transmitted through a router and/or switch 608 (hereinafter "mobile switching center (MSC) 612"), which may be coupled to, or integrated with, the network access device 120 shown in FIG. 1.

An incoming call may be directed to the station 104 from the PSTN 124 through the use of a telephone number, e.g., an MSISDN. This call may be received at a gateway MSC (GMSC) 612, of the (visited) home domain 604. The GMSC 612 may transmit a query to the VCC server 108 to determine the location of the station 104. Information about the station 104 associated with the registered subscriber identity may be returned to the GMSC 612. This information may include routing information that includes directives consistent with a non-VCC call. The GMSC 612 may then connect a non-VCC call to the station 104, e.g., by using standard CS call setup procedures.

If the (visited) home domain 604 includes a visited domain, a visiting MSC (VMSC) may be employed in the visited domain to facilitate communications between the station 104 and the home domain.

The VCC server 108 may also use the non-VCC subscriber identity for outgoing calls in this embodiment.

Figure 7:
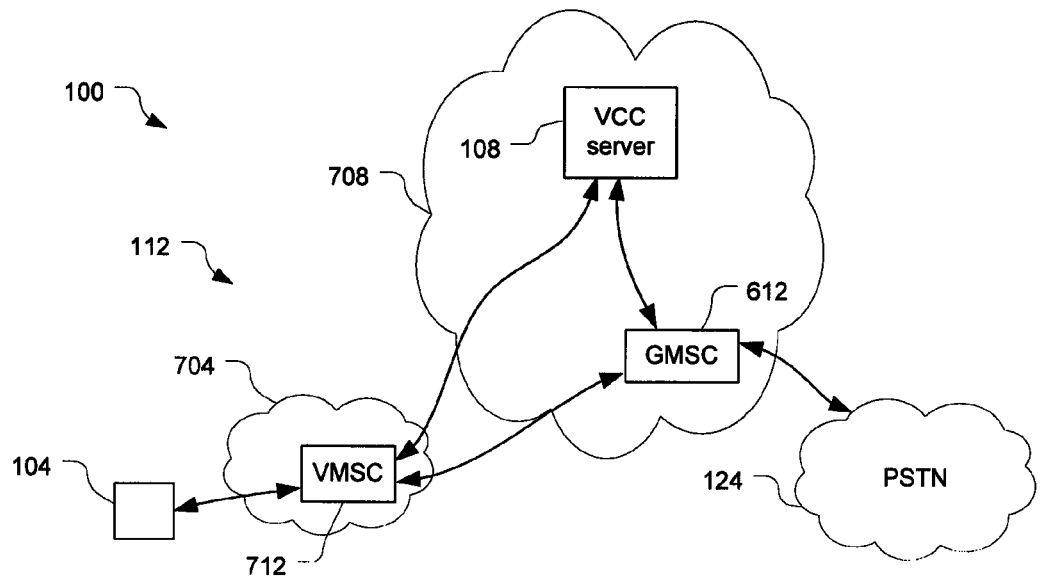
FIG. 7 illustrates the mobile communication system in accordance with another embodiment of this invention.

FIG. 7 illustrates the mobile communication system 100 in accordance with another embodiment of this invention. In this embodiment the network 112 may include a visited domain 704 and a home domain 708. The station 104 may be roaming and therefore may be connected to the mobile communication system 100 through a visited MSC (VMSC) 712. The identity manager 128 may be unable to determine whether the visited domain 704 has VCC capabilities, e.g., does not know if the visited domain 704 is a CAMEL network. Therefore, the identity manager 128 may select and register both the VCC subscriber identity and the non-VCC subscriber identity.

The VCC server 108 may be able to determine the VCC capabilities of the visited domain 704, e.g., determine if the visited domain 704 is a CAMEL network. Therefore, the VCC server 108 may be in a position to determine whether to use the VCC subscriber identity or the non-VCC subscriber identity for purposes of call routing. The VCC server 108 may respond with the appropriate subscriber identity when it receives an identity request from the GMSC 612, in response to the GMSC 612 receiving an incoming call from the PSTN 124. If the non-VCC subscriber identity is used, the GMSC 612 may use standard CS call setup procedures.

It may be noted that in this embodiment, the selection and registration of the VCC and the non-VCC subscriber identities may be done if the identity manager 128 is unaware of the VCC capabilities of the visited domain 704 and desires VCC services. If the identity manager 128 is unaware of the VCC capabilities of the visited domain 704 and does not desire VCC services, just the non-VCC subscriber identity may be selected and registered.

Figure 8:
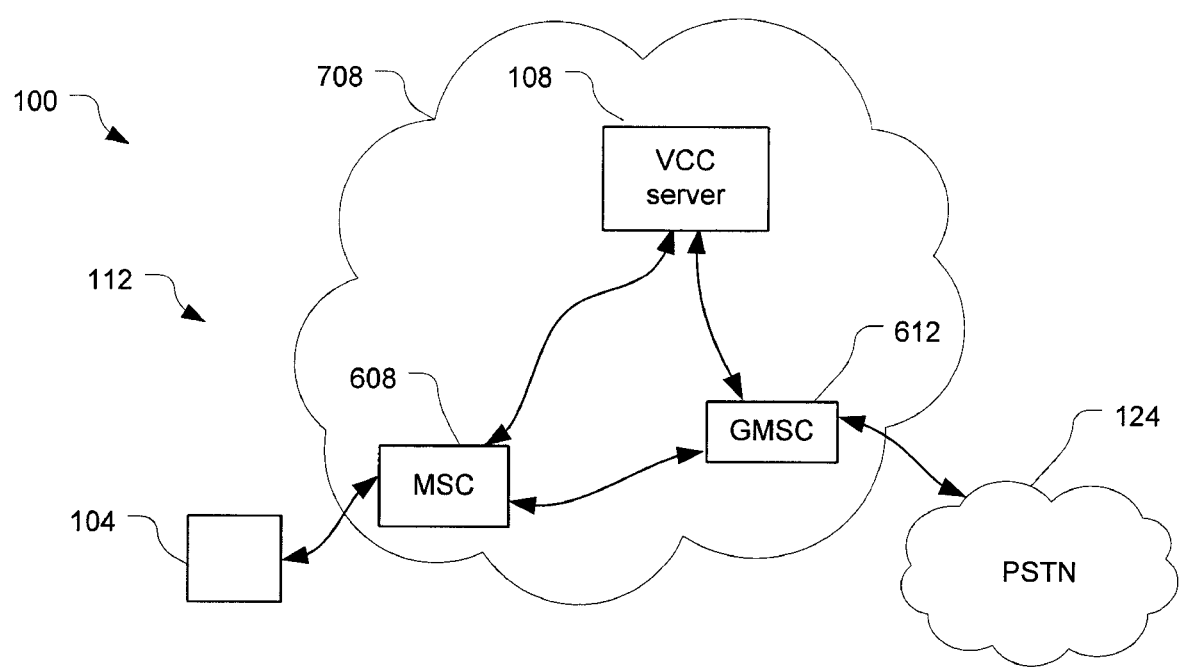
FIG. 8 illustrates the mobile communication system in accordance with another embodiment of this invention.

FIG. 8 illustrates the mobile communication system 100 in accordance with another embodiment of this invention. In this embodiment, the network 112 may include a home domain 708 and the station 104 may be coupled directly to the MSC 608.

In an embodiment, the identity manager 128 may determine that the station 104 does not desire (e.g., for charging reasons) VCC service or cannot support VCC service (e.g., the station 104 is a legacy device). This determination may be based at least in part on settings of the host 208, which may be configurable by a user of the station 104. Therefore, in this embodiment the identity manager 128 may select and register its non-VCC subscriber identity. As a result, the VCC server 108 may return routing information associated with a non-VCC call to the GMSC 612 in response to an identity request. All calls may be routed without VCC service using normal CS call setup procedures.

Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. An apparatus comprising:
    storage configured to store a plurality of mobile subscriber identities, the plurality of mobile subscriber identities mapped to a mobile station network number associated with a mobile device hosting the apparatus wherein the plurality of mobile subscriber identities comprise a voice-call continuity (VCC) subscriber identity and a non-VCC subscriber identity; and
    an identity manager coupled to the storage and hosted by the mobile device, the identity manager configured to:
        access a network to retrieve one or more capabilities of the network,
        determine call-continuity parameters based, at least in part, on the one or more capabilities of the network,
        select one or both of the VCC subscriber identity or the non-VCC subscriber identity, of the plurality of mobile subscriber identities, based at least in part on said determined call-continuity parameters, and
        register the selected subscriber identities with a database associated with the network to facilitate a policy on call continuity of the mobile device.

2. The apparatus of claim 1, wherein the apparatus is a subscriber identity module card.

3. The apparatus of claim 1, wherein the database comprises a home location register or a home subscriber server.

4. The apparatus of claim 1, wherein at least one of the one or more capabilities of the network is indicative of whether the network supports voice-call continuity (VCC).

5. The apparatus of claim 1, wherein the plurality of mobile subscriber identities are international mobile subscriber identities (IMSIs).

6. The apparatus of claim 1, wherein the mobile station network number is a mobile station integrated services digital network (MSIDN) number.

7. The apparatus of claim 1, wherein determine the call-continuity parameters is further based on capabilities of the mobile device, settings of the mobile device, and/or capabilities of an access domain to which the mobile device has access.

8. The apparatus of claim 1, wherein the identity manager is further configured to:
    receive an identity request from an application operating on the mobile device; and
    determine the call-continuity parameters based further on said received identity request.

9. A system comprising:
    an omnidirectional antenna configured to provide a mobile device hosting the omnidirectional antenna with access to a network, said access including a wireless connection between the mobile device and a network access device of the network;
    storage configured to store a plurality of mobile subscriber identities, the plurality of mobile subscriber identities mapped to a mobile station network number associated with the mobile device, wherein the plurality of mobile subscriber identities comprise a voice-call continuity (VCC) subscriber identity and a non-VCC subscriber identity; and
    an identity manager coupled to the storage and to the omnidirectional antenna and hosted by the mobile device, the identity manager configured to:
        access the network to retrieve one or more capabilities of the network;
        determine call-continuity parameters based, at least in part, on the one or more capabilities of the network;
        select one or both of the VCC subscriber identity or the non-VCC subscriber identity, of the plurality of mobile subscriber identities, based at least in part on said determination; and
        register said selected subscriber identities with a database associated with the network via the wireless connection to facilitate a policy on call continuity of the mobile device.

10. The system of claim 9, wherein the database comprises a home location register or a home subscriber server.

11. The system of claim 9, wherein at least one of the one or more capabilities of the network is indicative of whether the network supports voice-call continuity (VCC).

12. The system of claim 9, wherein determine the call-continuity parameters is further based on capabilities of the mobile device, settings of the mobile device, and/or capabilities of the network access device.

13. A system comprising:
    a network interface; and
    a service manager coupled to the network interface and configured to:
        receive, from a mobile device, via the network interface, a first and a second mobile subscriber identity, both the first and second subscriber identities mapped to a phone number associated with the mobile device, wherein the first identity is a voice-call continuity (VCC) subscriber identity and the second identity is a non-VCC subscriber identity;
        receive a request for routing information, said request including the phone number;
        determine call-continuity capabilities of an access domain to which the station is coupled;
        select either the first or second subscriber identity based at least in part on said determined call-continuity capabilities; and
        provide, in response to said received request for information, routing information associated with the selected subscriber identity.

14. The system of claim 13, further comprising:
    a database to store said phone number, first and second subscriber identities, and routing information associated with each of the first and second subscriber identities.

15. The system of claim 14, wherein said database comprises a home location register and/or a home subscriber station.

16. The system of claim 14, wherein said system comprises a voice-call continuity (VCC) server.

17. A tangible non-transitory machine-accessible medium having associated instructions, which, when executed by a processor of a mobile device, enable the mobile device to:
- access a network to retrieve one or more capabilities of the network;
- determine call-continuity parameters based, at least in part, on the one or more capabilities of the network;
- select one or both of a VCC subscriber identity or a non-VCC subscriber identity from a plurality of mobile subscriber identities stored in storage based at least in part on the determined call-continuity parameters; and
- register the selected subscriber identities with a database associated with the network via a wireless network interface of the mobile device hosting the subscriber identity module to facilitate a policy on call continuity of the mobile device.

18. The machine-accessible medium of claim 17 having associated instructions, which, when executed, further enable the SIM to:
- determine capabilities of the mobile device, settings of the mobile device, and/or capabilities of an access domain to which the mobile device has access; and
- determine call-continuity parameters further based on said determined capabilities of the mobile device, settings of the mobile device, and/or capabilities of the access domain.

19. The machine-accessible medium of claim 18 having associated instructions, which, when executed, further enable the SIM to:
- receive an identity request from an application operating on the mobile device; and
- determine capabilities and/or settings of the mobile device based at least in part on said received identity request.

20. The apparatus of claim 1, wherein the identify-manager is further configured to determine whether a handover of an on-going communication on the mobile device may be performed from a first network access domain to a second network access domain based on the call-continuity parameters.

21. The machine-accessible medium of claim 17, wherein at least one of the one or more capabilities of the network is indicative of whether the network supports voice-call continuity (VCC).

22. A method comprising:
- accessing, by a mobile device, a network to retrieve one or more capabilities of the network;
- determining, by the mobile device, a plurality of call-continuity parameters based, at least in part, on the one or more capabilities of the network, wherein at least one of the one or more capabilities of the network is indicative of whether the network supports voice-call continuity (VCC);
- selecting, by the mobile device, one or both of a VCC subscriber identity or a non-VCC subscriber identity, from a plurality of mobile subscriber identities stored in a storage of the mobile device, based at least in part on the determined call-continuity parameters;
- registering, by the mobile device, the selected subscriber identities with a database associated with the network via a wireless network interface of the mobile device to facilitate a policy on call continuity of the mobile device.

23. The method of claim 22, further comprising:
- determining, by the mobile device, whether a handover of an on-going communication on the mobile device may be performed from a first access domain to a second access domain based on the plurality of call-continuity parameters.

* * * * *